United States Patent [19]
Levrai

[11] Patent Number: 5,848,827
[45] Date of Patent: Dec. 15, 1998

[54] BRAKING ASSISTANCE PNEUMATIC SERVOMOTOR WITH IMPROVED VALVE

[75] Inventor: Roland Levrai, Stains, France

[73] Assignee: Bosch Systems de Freinage, Drancy, France

[21] Appl. No.: 750,645

[22] PCT Filed: Dec. 4, 1996

[86] PCT No.: PCT/FR96/01930

§ 371 Date: Dec. 11, 1996

§ 102(e) Date: Dec. 11, 1996

[87] PCT Pub. No.: WO97/28034

PCT Pub. Date: Aug. 7, 1997

[30] Foreign Application Priority Data

Jan. 30, 1996 [FR] France ................................. 96 01042

[51] Int. Cl.⁶ .................................................. B60T 13/57
[52] U.S. Cl. .................. 303/114.3; 91/369.1; 91/376 R; 188/356
[58] Field of Search .............................. 91/369.1, 369.2, 91/37, 376 R; 188/356, 357; 303/114.3; 60/545, 547.1

[56] References Cited

U.S. PATENT DOCUMENTS

| | | | |
|---|---|---|---|
| 4,667,471 | 5/1987 | Fulwer et al. ............................ | 60/545 |
| 4,828,337 | 5/1989 | Wagner et al. ....................... | 303/114.3 |
| 5,437,217 | 8/1995 | Castel et al. ............................ | 91/369.2 |
| 5,483,866 | 1/1996 | Schlutter ................................... | 91/367 |
| 5,518,305 | 5/1996 | Jakobi et al. ......................... | 303/114.3 |

*Primary Examiner*—Robert J. Oberleitner
*Assistant Examiner*—Chris Schwartz
*Attorney, Agent, or Firm*—Leo H. McCormick, Jr.

[57] ABSTRACT

A pneumatic brake booster for providing braking assistance. The brake booster has a housing (10) with an axis of symmetry (X—X') separated sealingly by at least one movable partition (12) to define at least a first chamber (14) connected permanently to a source of low pressure and at least a second chamber (16). The second chamber (16) being selectively connected to the first chamber (14) or a source of high pressure through a three way valve structure actuated by a control rod (30,130). The three way valve structure have a valve member (36,136) which cooperates through an a first annular face (40,140) with a first annular valve seat (34,134) formed on a plunger (28,128) which slides in a bore (26,126) of a piston (20,90). The annular face (40,140) of the valve member (36,136) being urged forward in the direction of the annular valve seat (34,134) by a valve spring (42,142). The three way valve structure further includes a second valve member (46,146) which cooperates through an annular face (50,150) with a second annular valve seat (44,144) formed on the plunger (28,128). The annular face (50,150) of the second valve member (46,146) being urged rearwards in the direction of the second annular valve seat (44,144) by a second valve spring (52,152).

9 Claims, 4 Drawing Sheets

BRAKING ASSISTANCE PNEUMATIC SERVOMOTOR WITH IMPROVED VALVE

The present invention relates to pneumatic boosters or servo actuators, of the kind which are used to provide braking assistance for automobile vehicles.

BACKGROUND OF THE INVENTION

Such boosters are well known in automobile technology and comprise in general an envelope within which is disposed a piston formed from a hub and a skirt. The piston defines a front chamber connected permanently to a source of low pressure and a rear chamber connected selectively to the front chamber or to a source of high pressure by a valve means. This valve means is actuated by a control rod which is capable of bearing, through the intermediary of the front face of a plunger, on the rear face of a reaction disc which is solid with a thrust rod, the thrust rod actuating a master cylinder. The valve means usually comprises a valve member whose annular front face co-operates with a first circular valve seat formed on the plunger and a second circular valve seat formed on the piston and of diameter greater than that of the first valve seat. The valve member is formed from a flexible membrane fixed seatingly by its outer peripheral edge to the piston, the annular front face of the valve member being urged forwards by a valve spring.

Such boosters present several disadvantages. In particular, to avoid having too long a dead stroke for the control rod, it is necessary to design the valve means in such a way that the "valve lift" between the valve member and the first valve seat is as small as possible. It follows that, during an actuation, the passage opened to the flow of air under high pressure towards the rear chamber is reduced, as well as the passage opened to the flow of air from the rear chamber towards the front chamber during brake release.

A disadvantage due to these reduced and turbulent air flow passages is based on the fact that the different movements of the air between the atmosphere, the rear chamber and the front chamber become considerably slowed down, and so known boosters present response times which are long.

Another result is that the operation of these boosters is accompanied by air intake noises which can become troublesome, all the more so as the structure of the hub of the piston, which presents a single radial passage towards the rear chamber and a single axial passage towards the front chamber, induces considerable turbulence in the moving air.

Moreover, because of the concentric and substantially coplanar disposition of the two valve seats, the flexible membrane of the valve member is subjected to a variable pressure differential between the high pressure which is substantially constant prevailing permanently within the tubular hub around the input rod, and the variable pressure prevailing in the annular chamber surrounding this part of the flexible membrane of the valve member, on one part of which is exerted the pressure prevailing in the front chamber of the booster and on another part of which is exerted the variable pressure prevailing in the rear chamber of the booster.

This pressure differential, which exists in the rest condition and in the phase of brake release, applies an axial force to the annular front face of the valve member which adds to the valve spring force and which the plunger of the valve must overcome during each phase of brake release to disengage the annular front face of the valve member from the first valve seat formed in the hub and re-establish the communication between the rear working chamber of the booster and the vacuum chamber, which requires the return spring of the input rod to be oversize and in particular results in the driver having to apply a high force to bring the booster into operation, this force being known in the art under the term of "step-in force".

The document FR-A-2 537 524 attempts to find a solution by providing air passages of increased cross section, but it still comprises a conventional valve means mounted in the tubular central part formed at the rear of the booster envelope, cooperating with a modified plunger, which presents a substantial surface are a subjected to the pressure differential and therefore requiring a large step-in force. Moreover, according to this document, not only must the envelope of the booster be of a special design, but also the structure of the piston hub presents only one radial passage towards the rear chamber and only one axial passage towards the front chamber, also inducing considerable turbulence in the moving air, which is unfavourable for the response time of the booster because it slows the movement of the air, and which generates operating noise.

SUMMARY OF THE INVENTION

The present invention is situated in this context and has as object to provide a booster in which the air flow passages between the atmosphere and the rear chamber on one hand and between the rear chamber and the front chamber on the other hand, will have as large a cross sectional area as possible without presenting any obstacles which could generate turbulence, so as to obtain silent operation and as short a response time as possible, simply, reliably and cheaply, while utilising a booster envelope of conventional design.

To this end, the present invention provides a pneumatic booster for braking assistance, comprising an envelope having an axis of symmetry separated sealingly by at least one movable partition structure into at least one front chamber connected permanently to a source of low pressure, and at least one rear chamber connected selectively to the front chamber or to a source of high pressure through a three way valve means actuated by a control rod, the three way valve comprising a valve member cooperating through an annular face with a first annular valve seat formed on a plunger which slides in a bore of a piston, the annular face of the valve member being urged forwards in the direction of the annular valve seat by a valve spring.

In accordance with the present invention, the three way valve comprises a second valve member which co-operates through an annular face with a second annular valve seat formed on the plunger, the annular face of the second valve member being urged rearwards in the direction of the second annular valve seat by a second valve spring.

Advantageously, the first and second annular valve seats are formed on radial shoulders of the plunger.

In accordance with features which are also advantageous, the first and second annular valve seats are contained in planes perpendicular to the axis of symmetry of the plunger and spaced apart by a predetermined axial distance.

Preferably, the three way valve comprises in addition an abutment structure comprising two radial shoulders which are axially spaced apart by a distance which is slightly less than the axial distance between the planes of the first and second annular valve seats, to define the extreme forward position of the valve member and the extreme rearward position of the second valve member. The abutment structure may then comprise axial passages formed in the radial shoulders and radial openings formed between the radial shoulders, these passages and openings being aligned in an axial direction with radial passages formed in the piston and communicating with the rear chamber of the booster. The piston may also comprise axial passages which open into the bore in which the plunger slides, and which communicate with the front chamber of the booster, these axial passages being aligned with the radial passages which communicate with the rear chamber of the booster.

In accordance with one embodiment, the three way valve is disposed in a rear tubular part of the piston solid with the movable partition structure of the booster.

In accordance with another embodiment, the three way valve is disposed in a piston of a control module which controls the booster remotely.

Advantageously, the control module comprises a stepped piston dividing a bore into a first volume connected permanently to the rear chamber of the booster through a duct and a second volume connected permanently to the front chamber of the booster through a duct and an annular boost chamber connected through a duct to the outlet of a pressure generator actuated by the booster.

Other objects, features and advantages of the present invention will appear more clearly from the following description of an embodiment thereof, given by way of illustration, with reference to the accompanying drawings.

BRIEF DESCRIPTION OF THE DRAWINGS

FIG. 1 shows a sectional view of a pneumatic booster for braking assistance designed to be placed in the conventional manner between the brake pedal of a vehicle and the master cylinder which controls the pressure in the hydraulic braking circuit of this vehicle.

DETAILED DESCRIPTION OF THE INVENTION

Figure 1:
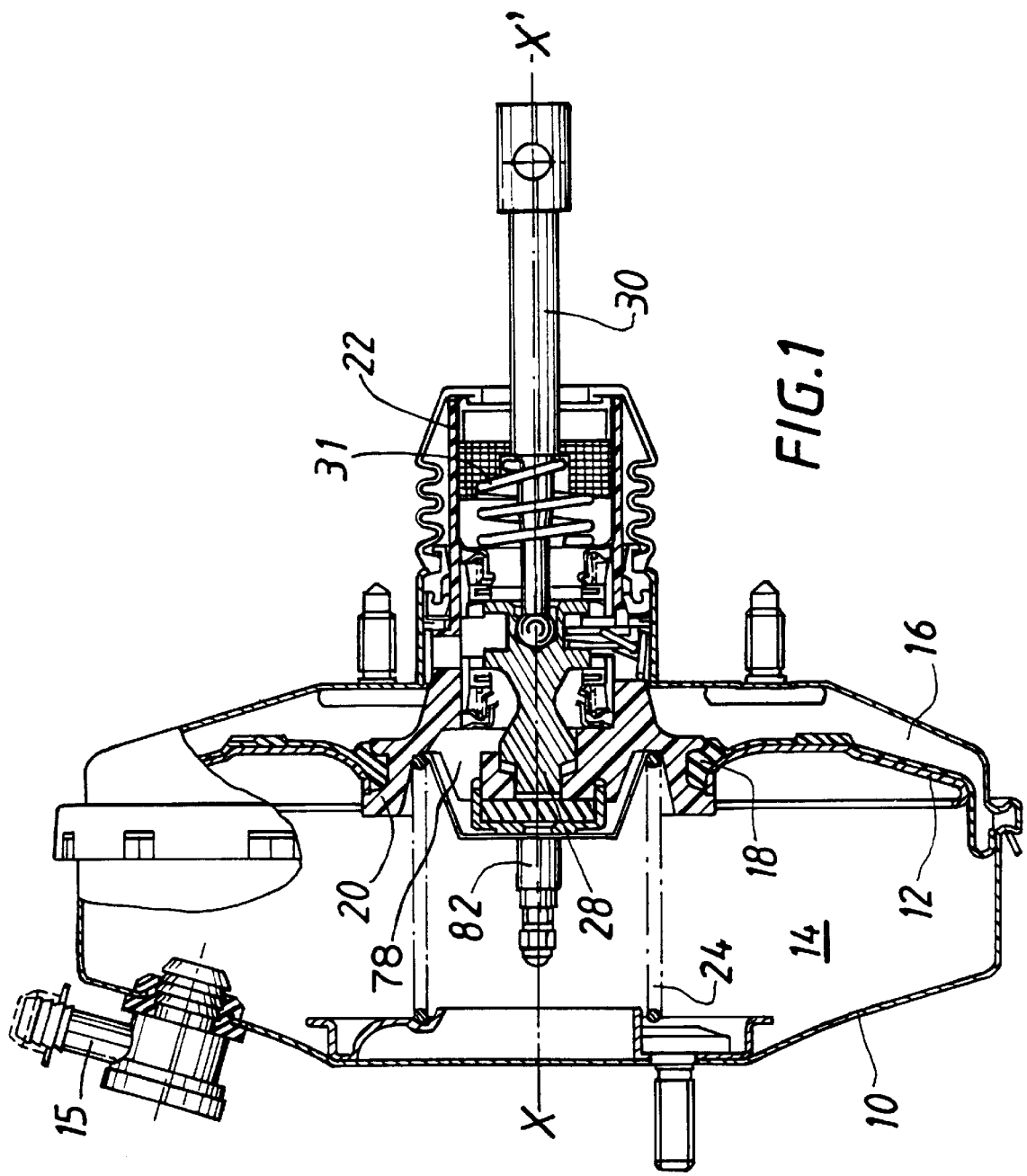
FIG. 1 shows an elevational view in longitudinal section of a pneumatic booster for braking assistance, provided with a valve member made in accordance with the present invention.

The convention is to call the "front" of the booster that part of it which is facing the master cylinder and the "rear" of the booster that part which is facing the brake pedal. In the drawings, the front is accordingly to the left and the rear to the right.

Figure 2:
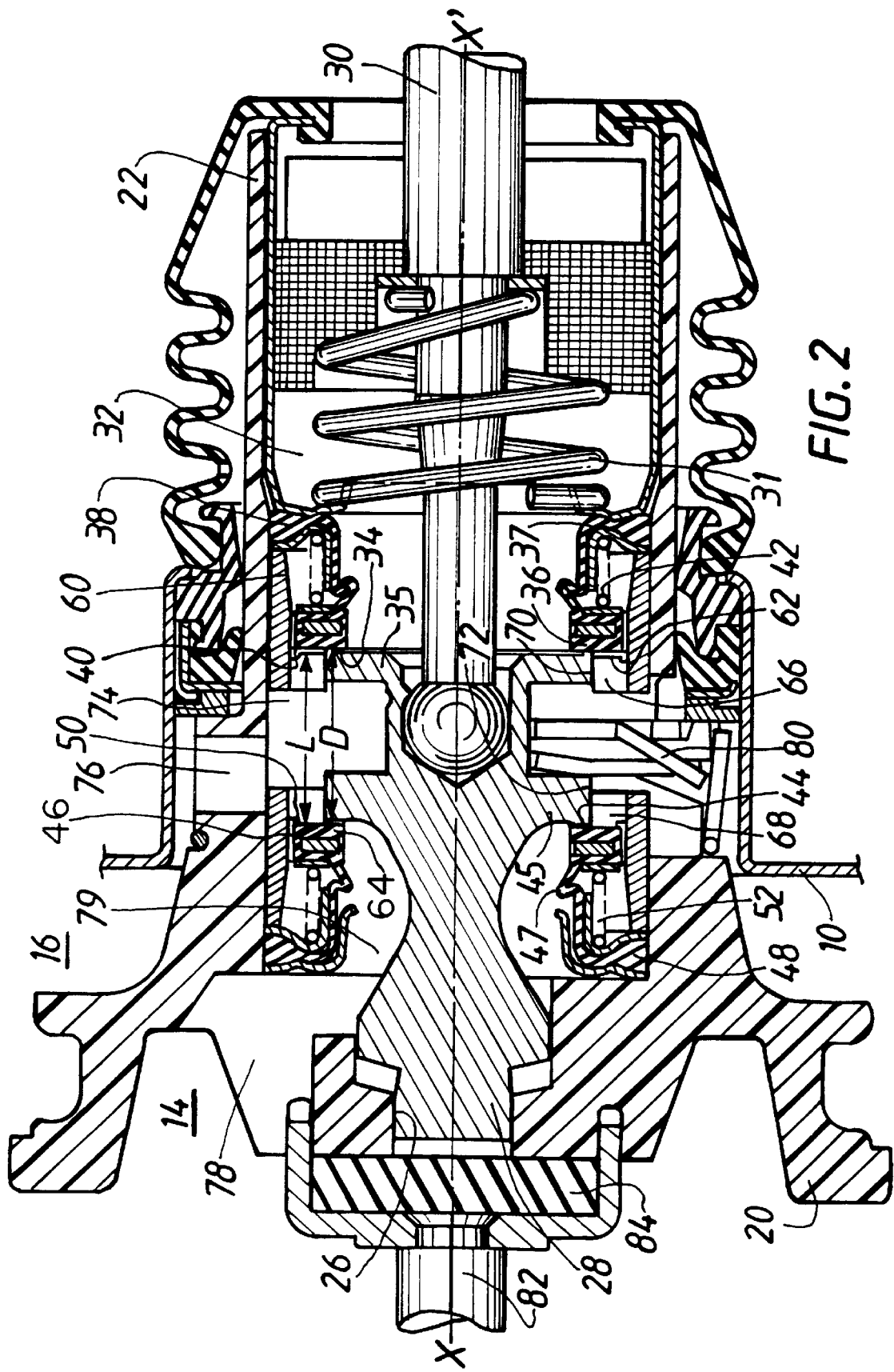
FIG. 2 shows a view to a larger scale of the rear central part of the booster of FIG. 1.

The booster shown in FIGS. 1 and 2 comprises an outer envelope 10 in the form of a shell, having rotational symmetry about an axis X—X'. Only the rear central part of this envelope 10 is shown in FIG. 2.

A movable partition structure 12 defines within the envelope 10 a front chamber 14, permanently connected to a source of vacuum through a duct 15, and a rear chamber 16. The movable partition 12 is associated with a flexible rolling diaphragm of elastomer whose inner peripheral edge is received sealingly by means of a bead 18 in a hollow booster piston 20, which is solid with the structure of the movable partition 12, and is disposed along the axis X—X' of the booster, the outer peripheral edge of the flexible diaphragm being fixed sealingly to the outer envelope 10.

The hollow piston 20 extends rearwards in the form of a tubular part 22 which passes sealingly through the rear wall of the envelope 10. A compression spring 24 interposed between the piston 20 and the front wall of the envelope 10 normally maintains the piston 20 in the rearward rest position illustrated in FIGS. 1 and 2 in which the rear chamber 16 is at its minimum volume and the front chamber 14 at its maximum volume.

A plunger 28, which is symmetrical relative to the axis X—X', is received slidingly at its front end in a bore 26, which may be stepped, formed in the central part of the piston 20. The front end of a control rod 30 of the booster also disposed along the axis X—X' is mounted pivotingly in a blind hole in the plunger 28. The rear end of the control rod 30 is controlled directly by the brake pedal of the vehicle (not shown), and is urged back towards to its rest position by a return spring 31 engaging it within the tubular part 22.

In the usual way, when the driver of the vehicle presses on the brake pedal, the control rod 30 actuates a three way valve means to bring the annular space 32 around the control rod 30 into communication with the rear chamber 16 and hence to create a pressure differential from one side to the other of the movable partition 12, resulting in a boost force which is proportional to the force exerted on the brake pedal.

Also in the usual way, the three way valve means comprises a first valve passage between the annular space 32 around the control rod 30 and the rear chamber 16, and a second valve passage between the rear chamber 16 and the front chamber 14.

In accordance with the present invention, the first valve passage comprises a first annular valve seat 34 formed on a radial shoulder 35 at the rear of the plunger 28 and cooperating with a first annular valve member 36.

The first valve member 36 forms the front end of a flexible tubular sleeve 37 of elastomer, whose rear end 38 is fixed sealingly within the tubular part 22, and it presents an annular front face 40 which is movable along the axis X—X', this front face being urged towards the front by a first valve spring 42.

The second valve passage comprises a second annular valve seat 44 formed on a radial shoulder 45 of the plunger 28 forward of the radial shoulder 35, and cooperating with a second annular valve member 46.

The second valve member 46 forms the rear end of a flexible tubular sleeve 47 of elastomer whose front end 48 is fixed sealingly within the tubular part 22, and it presents an annular rear face 50 which is movable along the axis X—X', this rear face being urged towards the rear by a second valve spring 52.

The annular valve seats 34 and 44 formed on the radial shoulders 35 and 45 of the plunger 28 are contained in planes which are perpendicular to the axis X—X' and spaced apart axially by a distance D.

A tubular abutment structure 60 is disposed in the tubular part 22, for example between the ends 38 and 48 of the sleeves 37 and 47, and comprises two radial shoulders 62 and 64 which face respectively rearwards and forwards and are spaced apart axially by a distance L which is slightly smaller than the distance D, so as to define the extreme forward position of the first valve member 36 and the extreme rear position of the second valve member 46.

The radial shoulders 62 and 64 have toothed edges and comprise axial passages 66 and 68 respectively, with regular angular spacing around the axis X—X'. The inner peripheral surfaces 70 and 72 of the shoulders 62 and 64 respectively are concentric, with a common axis X—X', and form guide surfaces for the outer peripheral surfaces of the radial shoulders 35 and 45 respectively of the plunger 28.

Between the radial shoulders 62 and 64, the structure of the tubular abutment 60 comprises radial openings 74, regularly spaced apart around the axis X—X', which communicate with the radial passages 76 formed in the tubular part 22 of the piston 20 and opening into the rear chamber 16 of the booster.

The piston 20 is also formed with axial passages 78 which are regularly spaced apart around the axis X—X' and put the front chamber 14 of the booster into communication with the front part 79 of the internal volume of the bore 26 around the plunger 28, in front of the shoulder 64.

Lastly, at least one abutment member 80 is mounted in the tubular part 22 of the piston 20 to limit the axial stroke of the plunger 28 relative to the piston 20 and define its rear rest position relative to the piston 20. The abutment member 80 passes through the opening 74 and the passages 76, for example, in order to form a stop for the rear face of the shoulder 45 of the plunger 28.

In the rest position, the various components of the booster occupy the relative positions shown in FIGS. 1 and 2. In this position, the plunger 28 bears against the rear of the abutment member 80 under the force applied by the spring 31. The first annular valve seat 34 bears against the first valve member 36 and holds the valve member 36 away from the radial shoulder 62 by a distance equal to the difference D–L plus a quantity Δ.

In this rest position, the second valve member 46 bears against the radial shoulder 64 under the action of the spring 52, the second valve seat 44 being spaced from the second valve member 46 by the amount Δ. The front chamber 14 and rear chamber 16 of the booster accordingly communicate through the intermediary of the axial passages 78, the annular volume 79, the valve passage 44–46, the axial passages 68, the radial openings 74 and the radial passages 76. The chambers 14 and 16 are otherwise isolated from the annular space 32 by the valve passage 34–36, which is closed in the rest position.

To obtain braking action, the driver of the vehicle presses on the brake pedal, which results in a movement forwards of the control rod 30 and of the plunger 28. The plunger 28 slides in the bore 26 and between the guide surfaces 70 and 72 and, in a first phase, moves forward the distance Δ. During this movement, the second valve seat 44 comes to bear on the second valve member 46, which it lifts slightly off the shoulder 64, thus isolating the two chambers 14 and 16 from each other, whereas the first valve member 36, while still bearing against the first valve seat 34, comes into contact with the shoulder 62. The two valve passages 34–36 and 44–46 are then both closed.

The movement forwards of the control rod 30 and the plunger 28 continue, and the second valve seat 44 carries forwards the second valve member 46 against the action of the spring 52, while accordingly maintaining the second valve passage 44–46 closed, whereas the first valve seat 34 moves away from the first valve member 36, abutting against the shoulder 62, and thus opens the first valve passage 34–36.

The air at atmospheric pressure within the annular volume 32 can thus pass into the rear chamber 16 through the valve passage 34–36, the axial passages 66, the radial openings 74 and the radial passages 76.

Advantageously, as a result of the present invention, the axial passages 66, the radial openings 74 and the radial passages 76 are aligned in the axial direction and extend over circular arcs subtending the same angle at the centre. It will therefore be understood that these openings can be given angular sizes which are relatively large, since the different members which the three way valve comprises and which are described above are only subjected to relatively small forces, and therefore do not need to have a very great mechanical strength.

In addition, it will be seen that the two valve passages, between the atmosphere and the rear chamber on one hand, and between the rear chamber and the front chamber on the other hand, are disposed in different transverse planes, and are no longer coplanar as in the conventional designs of the prior art. It follows that the diameter of the valve passage 34–36 is independent of that of the valve passage 44–46, and is only limited by the diameter of the tubular part 22 or by that of the abutment structure 60. A relatively large diameter can therefore be given to the valve passage 34–36, resulting in a correspondingly large cross sectional area for the air passage.

On account of the increased cross section of the air passages, the pressure can hence increase relatively rapidly in the rear chamber 16 of the booster and create a pressure difference across the movable partition 12, resulting in a boost force which increases rapidly to move it forwards, this force being transmitted to a thrust rod 82 through an annular front face of the piston 20 acting on a reaction disc 84, against the central part of which the front face of the plunger 28 bears. A booster has therefore indeed been provided whose response time is reduced in considerable proportions.

It will be understood that the same phenomenon of reduction in the response time of the booster is produced during brake release. In fact, when the force applied to the control rod 30 decreases, the control rod moves backwards and brings the plunger 28 with it in its movement. In this backwards movement, the first valve seat 34 of the plunger 28 goes back into contact with the first valve member 36, bearing on the shoulder 62, the second valve seat 44 still being in contact with the second valve member 46. The two chambers 14 and 16 are then isolated from each other and from the external atmosphere.

Next, the second valve member 46 comes into contact with the shoulder 64, whereas the first valve member 36 is lifted by the shoulder first valve seat 34 and, as the plunger 28 continues to move backwards, the second valve seat 44 moves away from the second valve member 46, which is left bearing on the shoulder 64.

The air contained in the rear chamber 16 is then sucked into the front chamber 14 through the radial passages 76, the radial openings 74, the valve passage 44–46, the annular volume 79 and the axial passages 78.

In order to enable rapid re-establishing of pressure balance (in fact of partial vacuum) between the two chambers 14 and 16, the plunger 28 is allowed to move back a relatively large distance away from the piston 20. It will be seen that once again the air is led to flow through the valve passage 44–46, whose diameter is substantially larger than the traditional valve passages, and whose area is therefore larger and enables a higher flow rate, from which it follows that the response time is greatly reduced in the phase of brake release.

Moreover, as seen for the phase of actuation, the diameter of the valve passage 44–46 is only limited by the diameter of the tubular part 22 or by that of the abutment structure 60.

A relatively large diameter can therefore be given to the valve passage 44–46, resulting in a correspondingly large cross section for the air passage.

It will be seen therefore that due to the disposition of the valve seats 34 and 44 both formed on the radial shoulders 35 and 45 of the plunger, the rate of fluid flow between the atmosphere and the rear chamber, and between the rear chamber and the front chamber, is increased in significant proportions, reducing correspondingly the response time of the booster both during the brake application phase and during the phase of brake release.

The invention also enables the operating noise of the booster to be reduced in considerable proportions. It has indeed been seen that during braking the air flows through the valve passage 34–36, the axial passages 66, the radial openings 74 and the radial passages 76 and during the brake release through the radial passages 76, the radial openings 74, the valve passage 44–46, the annular volume 79 and the axial passages 78.

The particular design of the three way valve forming the valve element according to the invention enables the openings or passages 66, 74, 76 and 78 to be provided in equal numbers, and to be spaced regularly around the axis X—X', and in such a way that their centres are all in the same plane, as has been shown in FIG. 2. Accordingly, the masses of air which are set in motion during the operation of the booster fitted with a valve element according to the present invention will have a velocity whose components are contained only in one plane, for example the plane of FIG. 2.

In other words, the flow of air within the booster is perfectly symmetrical about the axis X—X' in all the cases of operation, that is to say that all turbulence is eliminated, as also is the noise which results from it.

Figure 3:
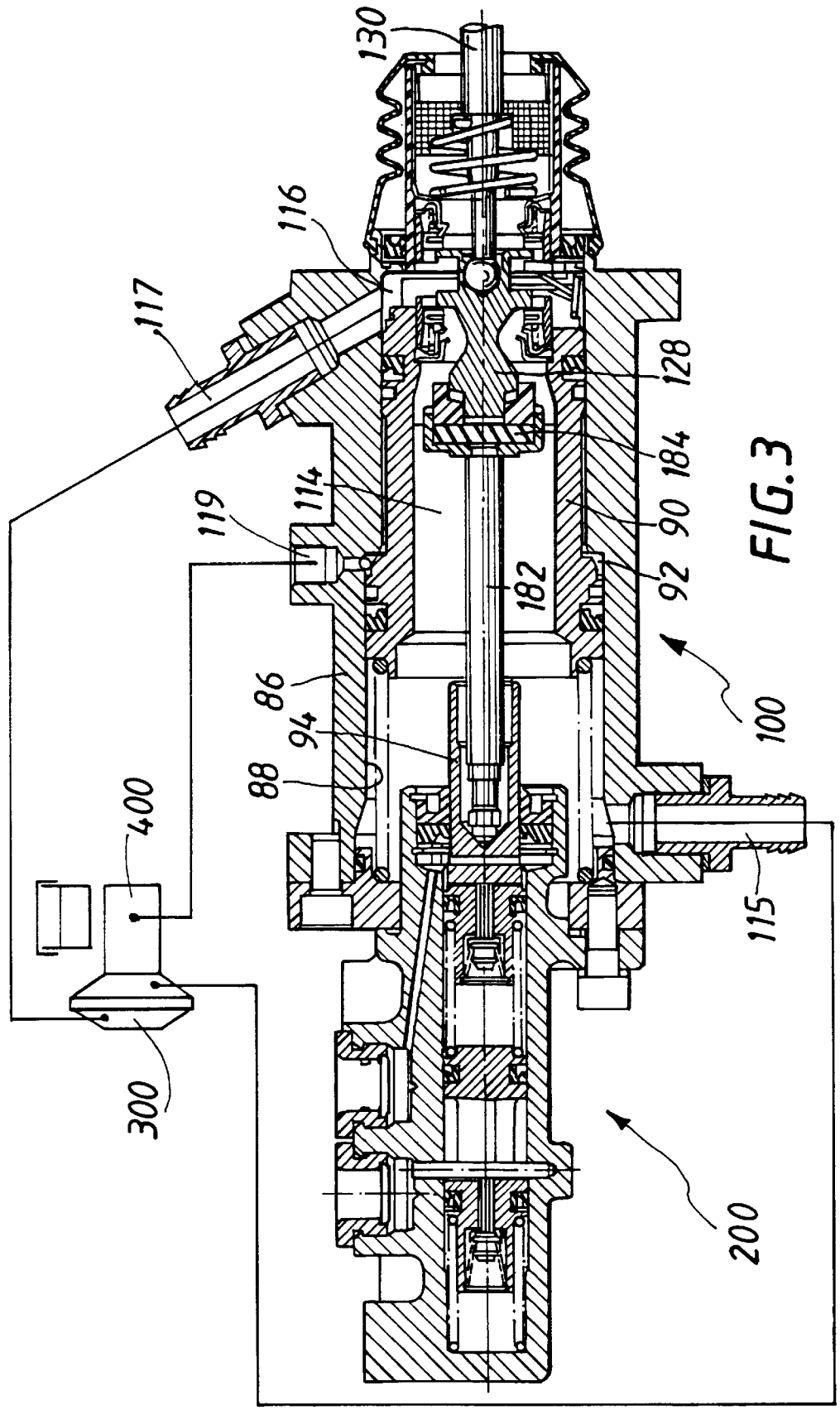
FIG. 3 shows an elevational view in longitudinal section of a control module of a pneumatic booster for braking assistance, this module being provided with a valve member made in accordance with the present invention.
Figure 4:
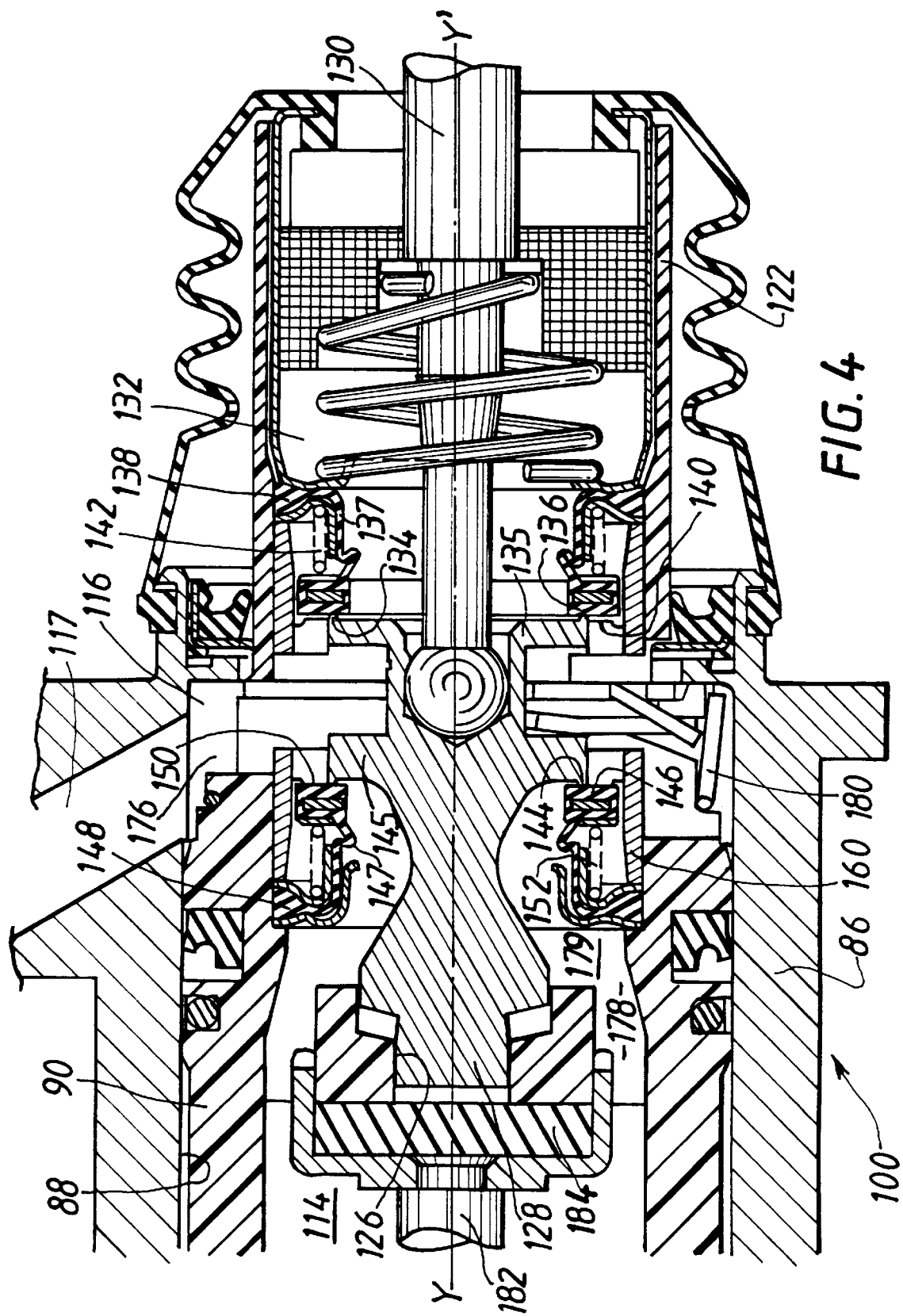
FIG. 4 shows a view to a larger scale of the rear central part of the control module of FIG. 3.

In FIGS. 3 and 4 is shown a second embodiment of the present invention, which is applicable to a control module 100 for a booster of the kind which is described for example in the document EP-A-O 326 965. In these drawings, elements corresponding to those of FIGS. 1 and 2 are given the same reference numbers, increased by one hundred.

The control module 100 is actuated by a control rod 130 connected to a brake pedal (not shown) disposed in the passenger compartment of the vehicle. The module 100 comprises a body 86 which is symmetrical in rotation about an axis Y—Y' and is formed with a stepped bore 88 within which slides sealingly a stepped piston 90. The piston 90 divides the bore 88 internally into a first volume 116 formed at the rear of the bore and a second volume 114 formed at the front, and connected permanently to a source of vacuum through a duct 115. The piston 90 is extended rearwards by a rear tubular part 122 which slides sealingly within the body 86, and it is formed with a bore 126, which may be stepped, within which slides a plunger 128.

The first volume 116 is brought selectively into communication with the second volume 114 or with the annular space 132 around the control rod 130, where atmospheric pressure prevails for example, through a three way valve similar to that which was described with reference to FIGS. 1 and 2, disposed in a recess in the piston 90, and actuated by a plunger 128 solid with the control rod 130 and symmetrical relative to the axis Y—Y' of the control module 100.

As for the first embodiment of the invention, a first valve passage comprises a first annular valve seat 134 formed on a radial shoulder 135 at the rear of the plunger 128 and cooperating with a first annular valve member 136.

The first valve member 136 forms the front end of a flexible tubular sleeve 137 of elastomer whose rear end 138 is fixed sealingly within a rear tubular part 122 of the piston 90, and it presents an annular front face 140 which is movable along the axis Y—Y', this front face being urged forwards by a first valve spring 142.

The second valve passage comprises a second annular valve seat 144 formed on a radial shoulder of the plunger 128 forward from the radial shoulder 135, and cooperating with a second annular valve member 146.

The second valve member 146 forms the rear end of a flexible tubular sleeve 147 of elastomer, whose front end 148 is fixed sealingly within the rear tubular part 122, and it presents an annular rear face 150 which is movable along the axis Y—Y', this rear face being urged rearwards by a second valve spring 152.

A tubular abutment structure 160 identical with the structure 60 described above has the same role of guiding the plunger 128 and of limiting the extreme positions forwards and rearwards of the first and second valve members 136 and 146 respectively, and will therefore not be described in more detail.

The piston 90 is also formed with axial passages 178, regularly spaced apart around the axis Y—Y', and putting the second volume 114 of the control module 100 into communication with the volume 179 around the plunger 128, and an abutment member 180 is mounted in the piston 90 to limit the axial stroke of the plunger 128 relative to the piston 90 and to define its rearward rest position relative to the piston 90.

As shown in FIG. 3, the control module 100 is designed to control remotely a booster 300, shown schematically, formed from an envelope divided internally by a sealed movable partition into a front chamber connected permanently to the second volume 114 through the duct 115, and a rear chamber connected permanently to the first volume 116 through a duct 117.

A pressure generator such as a single master cylinder 400 is fixed on the front wall of the booster 300 and is actuated by this booster. The outlet of this pressure generator 400 is connected through a hydraulic duct 119 to an annular boost chamber 92 formed in the body 86 of the control module 100 between the shoulders of the stepped bore 88 and of the stepped piston 90.

In this design, when the driver of the vehicle actuates the brake pedal, the control rod 130 is displaced forwards. The plunger 128 then controls the functioning of the three way valve as has been described above in order that the valve first isolates the volumes 114 and 116 from each other, then puts the first volume 116 into communication with the annular space 132. The result is an increase in pressure in the volume 116, transmitted through the duct 117 to the rear chamber of the booster 300, whose front chamber is connected permanently to the source of vacuum.

This pressure difference is exerted across the two faces of the movable partition of the booster 300 and tends to move it forwards, so that it displaces the piston of the pressure generator 400 and causes an increase in pressure in the duct 119, which is transmitted to the annular boost chamber 92.

The pressure in the annular chamber 92 is exerted on the shoulder of the piston 90 and tends to move it forwards. The piston 90 comprises an annular face surrounding the front face of the plunger 128, these two faces bearing against a reaction disc 184 solid with a thrust rod 182. The reaction disc 184 therefore receives simultaneously the input force transmitted by the plunger 128 and the boost force transmitted by the piston 90 on which is applied the pressure within the chamber 92. The reaction disc 184 and the thrust rod 182 transmit the addition of these two forces to the piston 94 of a master cylinder 200, which then generates a pressure increase in the brake actuators (not shown) producing the boosted brake action required by the driver of the vehicle.

As in the previous embodiment, the axial passages and the radial openings formed on the abutment structure 160, and the radial passages formed in the piston 90 are aligned in the axial direction and extend over circular arcs subtending the same angle at the centre, so as to give them relatively large angular sizes, these different elements being subjected only to relatively small forces, and therefore not needing to have a very high mechanical strength.

Similarly, the two valve passages, between the atmosphere and the rear volume 116 on one hand, and between the rear volume 116 and the front volume 114 on the other hand, are disposed in different transverse planes, and their diameters are independent of each other. They can therefore be made of relatively large size, resulting in a correspondingly large cross sectional area for the air passage.

The pressure can accordingly increase relatively rapidly in the rear volume 116 of the control module 100, and therefore in the rear chamber of the booster 300, and create a pressure difference across the mobile partition resulting in a rapid increase in the hydraulic pressure in the boost chamber 92 to move the piston 90 forwards. Once again, a booster has been provided, driven by a control module whose response time is reduced in considerable proportions, both for the action of braking and for the action of brake release.

The noise of operation of the control module is also reduced in considerable proportions. As seen above, the particular design of the three way valve forming the valve means in accordance with the invention enables the different openings for passage of air to be provided in equal numbers, regularly spaced about the axis Y—Y', in such a way that their centres are in the same plane, as seen in FIG. 4. Accordingly, the masses of air set in motion during the operation of the control module fitted with the valve of the present invention will have a velocity whose components are contained only in one plane, for example that of FIG. 4.

In other words, the flow of air in the control module is perfectly symmetrical about the axis Y—Y', in all cases of operation, that is to say that all turbulence is eliminated as well as the noise which results from it.

It is to be understood that the invention is not limited to the embodiments which have been described but on the contrary is capable of receiving many modifications which will be apparent to a person skilled in the art. In particular, for example, the embodiment of the invention illustrated in FIGS. 1 and 2 is of course applicable in the same way to boosters of the tandem kind or to add on chambers.

I claim:

1. A pneumatic booster for braking assistance, comprising an envelope having an axis of symmetry, separated sealingly by at least one movable partition structure into at least a first chamber connected permanently to a source of low pressure, and at least a second chamber connected selectively to said first chamber or to a source of high pressure through a three way valve means actuated by a control rod, said three way valve comprising a valve member co-operating through an annular face with a first annular valve seat formed on a plunger which slides in a bore of a piston, said annular face of said valve member being urged forwards in the direction of said first annular valve seat by a valve spring, characterised in that said three way valve comprises a second valve member which co-operates through an annular face with a second annular valve seat formed on the plunger, the annular face of the second valve member being urged rearwards in the direction of said second annular valve seat by a second valve spring.

2. The pneumatic booster according to claim 1, characterised in that said first and second annular valve seats are formed on radial shoulders of said plunger.

3. The pneumatic booster according to claim 1, characterised in that said first and second annular valve seats are contained in planes perpendicular to an axis of symmetry of said plunger and spaced apart by a predetermined axial distance.

4. The pneumatic booster according to claim 3, characterised in that said three way valve further includes an abutment structure comprising first and second radial shoulders which are axially spaced apart by a distance which is slightly less than an axial distance between the planes of said first and second annular valve seats, said first radial shoulder defining an extreme forward position of said second valve member and said second radial shoulder defining an extreme rearward position of said second valve member.

5. The pneumatic booster according to claim 4, characterised in that said abutment structure includes axial passages formed in said radial shoulders and radial openings formed between said first and second radial shoulders, said axial passages and openings being aligned in an axial direction with axial passages formed in said piston and communicating with said second chamber of said booster.

6. The pneumatic booster according to claim 5, characterised in that said piston includes axial passages which open into said bore in which said plunger slides and which communicate with said first chamber of the booster, said axial passages in said piston being aligned with said radial passages in said abutment structure which communicate with said second chamber of said booster.

7. The pneumatic booster according to claim 1 characterised in that said three way valve is disposed in a piston of a control module which controls the booster from a remote position.

8. The pneumatic booster according to claim 7, characterised in that said control module includes a stepped piston dividing a bore into a first volume connected permanently to said second chamber of said booster through a first duct and a second volume connected permanently to said first chamber of said booster through a second duct, and an annular boost chamber connected through a third duct to an outlet of a pressure generator actuated by said booster.

9. The pneumatic booster according to claim 1, characterised in that said three way valve is disposed in a rear tubular part of said piston which forms a movable partition structure of said booster.

* * * * *